United States Patent [19]
Bingham et al.

[11] Patent Number: 5,414,841
[45] Date of Patent: May 9, 1995

[54] COMPUTERIZED SYSTEM FOR REPRESENTING DATA ITEMS USING TOKEN IDENTIFIERS

[75] Inventors: Ronald E. Bingham, Capitola; Michael J. Dockter, Hollister; Joel F. Farber, San Jose, all of Calif.; Kevin D. Seppi, Austin, Tex.

[73] Assignee: International Business Machines Corporation, Armonk, N.Y.

[21] Appl. No.: 963,885

[22] Filed: Oct. 19, 1992

[51] Int. Cl.⁶ ............................................. G06F 5/00
[52] U.S. Cl. .................... 395/600; 364/253.1; 364/282.1; 364/260.4; 364/260.9; 364/DIG. 1
[58] Field of Search ................. 395/800, 600

[56] References Cited

U.S. PATENT DOCUMENTS

| | | | |
|---|---|---|---|
| 4,771,391 | 9/1988 | Blasbalg | 364/514 |
| 5,007,045 | 4/1991 | Tsuzuki | 370/94.1 |
| 5,224,038 | 6/1993 | Bespalko | 364/419 |

OTHER PUBLICATIONS

S. Zatti, et al., "Naming and Registration for IBM Distributed Systems", IBM Systems Journal, vol. 31, No. 2, 1992, pp. 353–380.

Voss, F. W., "APPC/MUS Distributed Application Support", IBM Systems Journal, vol. 31, No. 2, 1992, pp. 381–408.

*Physical Design Equivalencies in Database Conversion*, Comm. of the ACM, Aug. 1990, v. 33 No. 8 p. 120 (8), by Gillenson, M.

*Building a Fast Megadatabase*, by Delonas, N., Lotus, Jul. 1990, Lotus Pub. Corp vol. 6, No. 7, p. 25 (5).

*Primary Examiner*—Eric Coleman
*Attorney, Agent, or Firm*—Prentiss W. Johnson; Esther E. Klein

[57] ABSTRACT

A computer token identification system uses a plurality of unique tokens to represent a plurality of items. The token architecture consists of a delimiter field, a version field, and a variable field. The delimiter field contains at least one token recognition character. The version field immediately follows the delimiter field and contains the version string of at least one character identifying a unique token version. The variable field immediately follows the version field and contains a variable string of at least one character conforming to a format specification for the token version. Each variable string is unique for a token version. The version string and variable string can be of varying lengths, and the characters of the version string and variable string that are adjacent are from different character set types.

17 Claims, 3 Drawing Sheets

TOKEN IDENTIFICATION TABLE

$v_i \in \{0...9\}$
$b_1 \notin \{0...9\}$ — 47

$G_i \in \{A...Z\}$
$C \in \{0...9\}$
$I_i \in \{0...9, A...Z\}$
$e \notin \{0...9, A...Z\}$ $$\underset{70}{\longrightarrow} \quad \underset{72}{<} \quad \underset{74}{1} \quad \underset{76}{AA} \quad \underset{80}{4} \quad \underset{78}{0}$$

COMPUTERIZED SYSTEM FOR REPRESENTING DATA ITEMS USING TOKEN IDENTIFIERS

FIELD OF THE INVENTION

This invention relates to computerized systems for organizing and representing data items, and more particularly to token identifier systems used to identify data instances.

BACKGROUND OF THE INVENTION

Numerous token or tag identification systems or schemes are widely used to represent different types of objects, events and locations. Examples of identification schemes commonly used today are license plate identifiers for cars, social security numbers for people, and Library of Congress identifiers for books. Computer systems use tokens or tags to identify everything from system messages to system user input. Computer networking systems use tokens to identify system users and error messages on a network. Computerized database systems use tokens for identifying and retrieving data items stored on computer storage areas.

Token identifiers are particularly useful for classifying objects stored in computerized database systems. Unique token identifiers are used as candidate keys for retrieving from a computerized database, information relating to items or instances identified by the tokens.

There is a particular need for a token identification scheme that can be used with computer databases that are interconnected worldwide and require unique identifiers across a large name space supporting parallel independent assignment without conflicts which require the introduction of conflict resolution schemes.

Computer network systems have grown to be larger and more interconnected. When network interconnections were limited, objects, such as resources, applications, or devices, in the networks were named according to different proprietary schemes. Now, the existing naming spaces which are limited to specific sizes and scopes, are unable to cope with growth and increasing user needs. Furthermore, cooperative efforts rather than proprietary efforts are needed in order to provide compatibility.

When the network systems use the same format for token identifiers there can be problems with systems generating the same tokens which eliminates the token uniqueness. When the systems use a different format for the token identifiers, one system may not be able identify or make use of the other systems' tokens.

An example of a proposed identification scheme is described in Zatti, S, Ashfield, J, Baker, J, and Miller, E., *Naming and Registration for IBM Distributed Systems*, IBM Systems Journal, vol 31, no. 2, 1992, pp 353–380. The proposed scheme conforms to standards criteria. The international standards organizations (ISO) reference model introduces the concept of Application Entity Title (AET). The AET is a high-level identifier that allows applications and users to denote a component of an application that performs communication functions. An AET is mapped by an application layer directory to low level addressing information used by the Association Control Service Element to establish associations. The International Organization for Standardization-Consultative Committee on International Telegraph and Telephone defined "Distinguished Names" which provides a syntax for the identifier. The Zatti scheme provides an extensible, global naming scheme. However, the approach is complicated and allows for conflicts which must be resolved using a conflict resolution scheme. Also, the Zatti approach does not provide an algorithm for the automated generation of unique tokens.

In general, the token identification schemes currently used are inadequate due to limitations on the use of the tokens and other problems inherent within the schemes.

Predominantly, the token identification schemes currently being used are directed towards providing tokens for a particular group objects for a single purpose. The telephone numbering scheme is only used for identifying telephones and the Library of Congress numbering scheme is only used for identifying documents. These schemes are not designed to be used for more than one type of object. The Universal Product Codes (UPC) provide an attempt at universality. However the codes are limited to use on products and have the problem of not being extensible.

A number of identification schemes currently being used rely on time or location to provide a mechanism for uniquely representing different items. However these schemes have consistency problems that hinder their use. Schemes that use tokens based on time have problems with consistency due to clocks not always being synchronized, granularity, and time zone differences. Schemes that use nodes at a location for uniquely identifying objects have consistency problems since the nodes can be moved and multiple servers can exist at one location.

Current schemes also have problems with extensibility when the token has a fixed length. A token identification scheme can become obsolete when a maximum token size is required since the pool of items being represented by the tokens can grow beyond expectations. For example, in a network system where network users are identified by fixed length tokens, if more users join the network system than originally anticipated, there can be a problem with providing enough unique tokens to distinguish and identify each user.

There are problems associated with identification schemes that are tied to a specific code set. There are many variations for code sets which limits a code set from being compatible on all systems. For example, there can be differences for the length of bytes. There are also differences from one country to the next. There are also some applications which require identifiers consisting of only printable characters that can be used by people and other applications where it is more efficient to use non-printable characters.

Current identification schemes also have migration problems. The token architecture may have to be expanded or altered due to unforeseen requirements. There is a need to allow for multiple versions of token identifiers that are orthogonal and can coexist well. Otherwise there is the problem of having to perform conversions or migrations and fallbacks, which can be difficult.

There is a need for unique standardized identifiers to tie computer database references to real world objects and events using a simple symbolic representation allowing easy identification management and association. In particular, there is a need for a token identification system to supply universally unique identifiers that are extensible, object independent and support parallel assignment from an arbitrarily large number of servers with uniqueness maintained.

SUMMARY OF THE INVENTION

An object of the invention is to provide a computerized token identification system for uniquely representing a plurality of items. The system comprises a plurality of unique tokens, computer generation means for generating the unique tokens, computer assignment means for associating a token with an item, computer recognition means for recognizing a token, and computer identification means for identifying the item represented by the unique token. While the system provides association means and identification means, there is no requirement that the tokens generated by the system are ever associated with an item or instance. The requester of the token has full control over token usage. An advantage of the present invention is the component parts of names are generated in a simple, sequential series (although any non-repeating series could be used). This allows objects to be named without human intervention. Notions such as location, content, content type and time can be tracked separately and associated with a token as needed.

The tokens comprise a delimiter field containing a token recognition character, a version field following the delimiter field containing a version string of at least one character which is used to identify a unique token version, and a variable field adjacent the version field containing a variable string of at least one character conforming to a format specification for the unique token version, where each variable string is unique for a unique token version.

In one form of the invention, the version field is adjacent the delimiter field, the version string and variable string are of varying lengths and the characters of the version string and variable string that are adjacent are from different character set types.

In the preferred embodiment, the token identifies a version number, the size of which is virtually unlimited. The use of a version number allows the support of multiple, simultaneous formats within the body of the section of the token in the variable field. The version number precisely determines the mapping to be used for the variable field. Each version is orthogonal and can coexist well, eliminating the need to do later conversions or migrations and fallbacks, which can be difficult. The support of multiple versions provides flexibility and longevity to the token architecture and the system for computerized token identification. The token architecture can thus be expanded and tailored for future unforeseen needs.

The token architecture is a simple character string structure. The tokens can consist of all printable characters making it suitable for imbedding in interactive software applications. The architected tokens can support or use any binary character sequence. The token architecture can be applied to any coded character set using an arbitrary number of bits to represent each character. The representation bit values of the characters used can optionally be chosen to be printable codepoints. There can be some versions that are designed to be printable while other versions can coexist which are completely binary codings used to maximize the density of the name space and minimize tag length.

The token identification system can be used in both new and existing software applications. The token architecture can be used to generate identifiers used in current systems providing a fast and simple method for generating tokens.

The tokens can support or use any binary character set. The architecture can be applied to any coded character set using an arbitrary number of bits to represent each character. The representation (bit values) of the characters can optionally be chosen to be printable codepoints.

A verification procedure is incorporated in the architecture by using an uncommon recognition character followed by a version string of characters from a stipulated character set type. All tokens for all versions can be verified as tokens as long as they have the specified combination for the recognition character and version identifier.

Each version is orthogonal and can coexist well, eliminating the need of later having to perform conversions or migrations and fallbacks, which can be difficult. The support of multiple versions provides flexibility and longevity to the token architecture and the system for computerized token identification. The token architecture can thus be expanded and tailored for future unforeseen needs.

In one version of the unique tokens, the variable field comprises a generator identifier field, a verification field, and an identification field.

The generator identifier field is adjacent to the verification field and contains a generator identifier string of at least one character. The generator identifier string identifies the generator of the unique token. The verification field contains a verification character used to verify the correctness of the unique token. The use of a verification character allows the generated tokens to employ a self-checking feature to enhance integrity and increase reliability. The identification field is adjacent to the verification field and contains an identification string of at least one character. The identification string is unique for a unique token generator.

In the preferred embodiment, the generator identifier string and the identification string are varying lengths. The verification field differs from the generator identifier field and is of fixed length. The token is delimited by a character from a different character set type from the identification string character type.

It is an object of the invention to provide a general purpose system for generating unique tokens (also referred to as IDs, tags or handles) that are extensible and support parallel assignment from an arbitrarily large number of servers with uniqueness maintained.

It is a further object of the invention to provide a token architecture where there are varying length fields in order to provide a virtually boundless naming domain.

It is a further object of the invention to provide a token identification system using tokens that are independent of and can be applied to any object, event or location, such as persons, books, videos, license plates, telephone numbers, addresses, the borrowing of a book, a phone call, altitude, a date or time. The tokens can also be used to identify instances of objects.

It is a further object of the invention to provide a token identification system using a token architecture that has no internal hierarchy, complex order, location, or time basis.

A further object of the invention is to provide a token identification system where the generation of the token uses rules that are simple, encapsulating the minimum information which is not related to object or events.

DESCRIPTION OF PREFERRED EMBODIMENT

Figure 1:
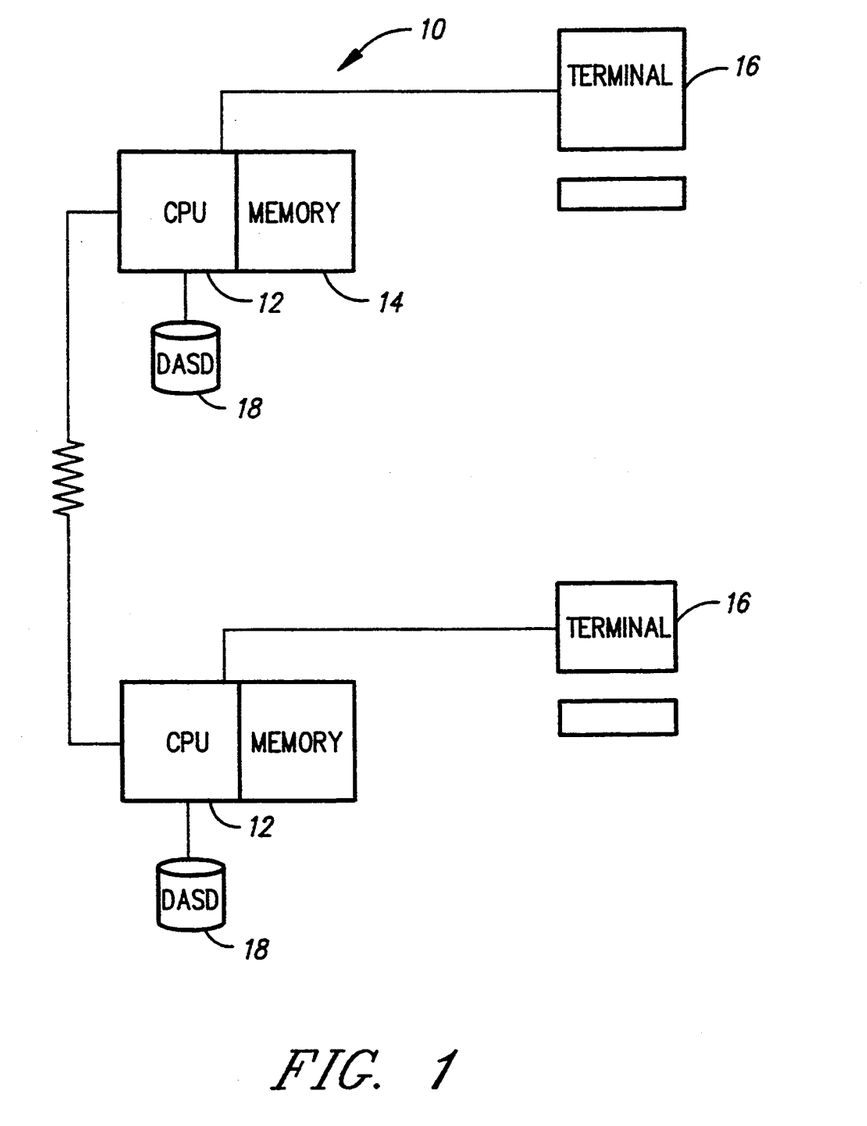
FIG. 1 is a schematic diagram of a computer system capable of generating and processing unique token identifiers.

FIG. 1 shows a computer system 10 providing a token identification system. The computer system 10 includes a processor (CPU) 12, memory 14 and a terminal 16 by which a computer user can interact with the system. The computer system 10 consists of a plurality of data processors which are all in communication. The computers can each be running a database management system (DBMS) which organizes data stored on a database. The data is stored on an external storage device 18 such as a direct access storage device (DASD).

There are a number of processes which the CPU tracks and controls including displaying system messages, identifying system users and organizing and retrieving data in the database. Tokens are used as labels identifying each process for storage organizational purposes.

The CPU 12 of the system 10 runs a series of commands to generate unique token identifiers which can be assigned to a variety of items including the tracking of internal system processes. The token identification system can also be used by a system user at a terminal 16 for assigning token identifiers to a variety of objects or events for storage in a database.

The system used for generating the unique tokens does not have to be in a network system or be running a database program. Such a system is shown as an example of a type of system that could use the token identification system. The computer system for generating tokens, associating tokens with instances, recognizing tokens, and identifying the instance identified by a token, may each be separate computer systems, where such systems each have a CPU and memory or other storage device.

The computerized token identification system uses unique tokens to represent a plurality of items. The computer system 10 runs a program consisting of a number of commands implemented by the CPU to generate the unique tokens. The computer system also has an assignment capability in which each token is associated with an item that it represents. The token and description of the represented item are stored in the computer memory or on the DASD. In the preferred embodiment, the association of the token with the item can be implemented by the CPU using a table in which the token is a candidate key for a table entry providing a description of the stored item.

The computer system also contains recognition means for recognizing a token and identification means for identifying the item represented by the unique token. A parsing procedure can be used to recognize the token architecture when parsing text strings or program strings to identify tokens that are contained within the text or program to represent another item, as will be described in greater detail below. When a table is used to associate a token with a description of the represented item, the recognition means consists of using the tokens as candidate keys to locate the table entry containing a description of the item represented by that token. This would be performed by the CPU implementing a set of instructions to search a table stored in computer memory or external storage.

Methods of implementing the generation of tokens (according to the architecture to be described below), the assignment of tokens using tables, the recognition of a token and the identification of the item represented by the token using tables are well known to those skilled in the art.

Figure 2:
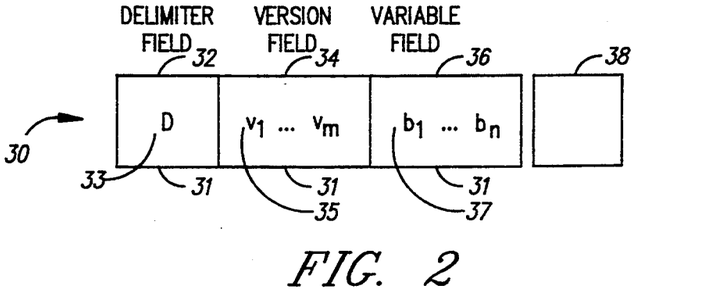
FIG. 2 is a diagram of a token architecture.

Referring to FIG. 2, the unique token architecture 30 is a simple character string or byte array structure comprising a sequence of concatenated fields 31. The architecture comprises a delimiter field 32, a version field 34, and a variable field 36 which is the body of the token.

The tokens 30 begin with the token delimiter field 32 which provides a means by which a recognition program can recognize the start of a token. The delimiter field 32 comprises a token recognition character 33.

The character used as the delimiter could be any arbitrary character but it needs to be unique enough so as to be able to signal the start of a token. The recognition delimiter character should have the characteristic of being a character symbol that is relatively uncommon in text so that it can be used when parsing text strings to identify tokens that are contained within the text or program to represent another item. The recognition delimiter character should be a character symbol available in most computer coded character sets, such as ASCII or EBCDIC. The recognition delimiter character should be operating system neutral, avoiding sequences such as blanks that may be automatically discarded in some computer systems. It is advantageous for the recognition character to be visible to the human eye in printable and common coded character sets. The recognition character delimiter choice should also be common across the universe of connected systems. In that way, any system that generates this tag can be correctly interpreted by any other system as being a generated unique token for the token identification system.

There is no character which meets all of these requirements on all systems and in all character sets. In the preferred embodiment (see FIG. 3), the character symbol "<" is used as the token recognition character to delimit the start of a token. The "<" symbol is relatively uncommon in text and programming languages. The "<" symbol is also visible to the eye and is available in most printable and common coded character sets. Therefore, the "<" symbol is an acceptable token recognition character.

The recognition character serves as an "eye-catcher"; that is, a human (and machine) readable initial delimiter for tokens. Of course, the recognition character has been, and will continue to be, used in contexts that have nothing to do with tokens, but when people or programs scan text for tokens, candidate tokens are easily identified. In control structures, databases and communications protocols, fields containing tokens will typically be known to contain tokens. In such cases, the recognition character can still be useful for debugging.

The token version field 34 immediately follows the delimiter field 32. The version field 34 contains a version string 35 of at least one character. The version string 35 identifies a unique token version. The token version identifies a predefined format for parsing and mapping the remaining sections of the token referred to as the body or the variable field 36.

The variable field 36 immediately follows the version field and contains a variable string 37 of at least one character. The variable string 37 conforms to a format specification for the unique token version specified by the version string 35. The variable string is unique for a token version and thus provides the unique identification for each token. The version number and the variable field can be used as a candidate key to entries in a table.

The use of a unique token version allows the support of multiple, simultaneous formats within the body of the section of the tag in the variable field 36. The token version precisely determines the mapping to be used for the variable field 36. During the token identification process, the version is identified and then a table or other device is used to provide the format for interpreting the remaining fields in order to use the information contained in those fields.

Each version is orthogonal and can coexist well, eliminating the need of later having to perform conversions or migrations and fallbacks, which can be difficult. The support of multiple versions provides flexibility and longevity to the token architecture and the system for computerized token identification. The token architecture can thus be expanded and tailored for future unforeseen needs.

The version string 35 can be virtually unlimited in size. This allows for an indeterminate number of unique token versions that can be implemented. The unique token version is identified by parsing the token from the point of the delimiter until a character from a different character set from that allowed for the version string is reached. For example, if the token version is a sequence of characters in the set of numeric characters (0 ... 9), the token version might end when the next character is in the set of alphabetic characters (A ... Z). The token version (and any other fields) could also be delimited as a set of characters with cardinality 1; that is, an explicit delimiter character as a comma. The character from the different character set type starts the variable string 37. The variable string is also of varying lengths. The end of the variable field (which is the end of the token) is identified by reaching a character 38 not in the character set defined for the token variable field.

The version identifier directly following the token recognition character provides a verification system for the tokens. A string can be identified and verified as a being token by determining that the string begins with the uncommon character used for the token recognition character followed by a character from the specified character set type for the version identifier.

Figure 3:
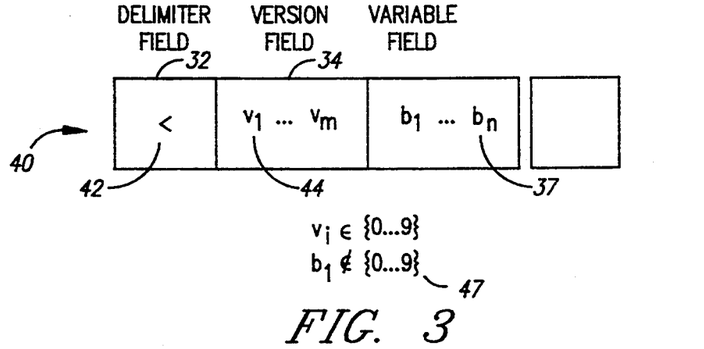
FIG. 3 is a diagram of a preferred embodiment of the token architecture of FIG. 1.

Referring to FIG. 3, a token architecture 40 representing a preferred embodiment of the token architecture 30 of FIG. 2 is shown. In the delimiter field 32, the character "<" 42 provides the delimiter for the token. Adjacent the delimiter field 32 is the version field 34. The version field 34 contains a version string 44 of numeric character values, where each character in the version string is in the set numerals 0 through 9. The version string 44 is varying lengths. The characters of the version string 44 and variable string 37 that are adjacent are from different character set types 47. The termination of the version string 44 is identified by the occurrence of a non-numeric character.

The use of numeric characters for the version identifier has the advantage of being recognized world wide. The internal representation for a numeric value in the code sets of different languages are the same on most systems.

Figure 4:
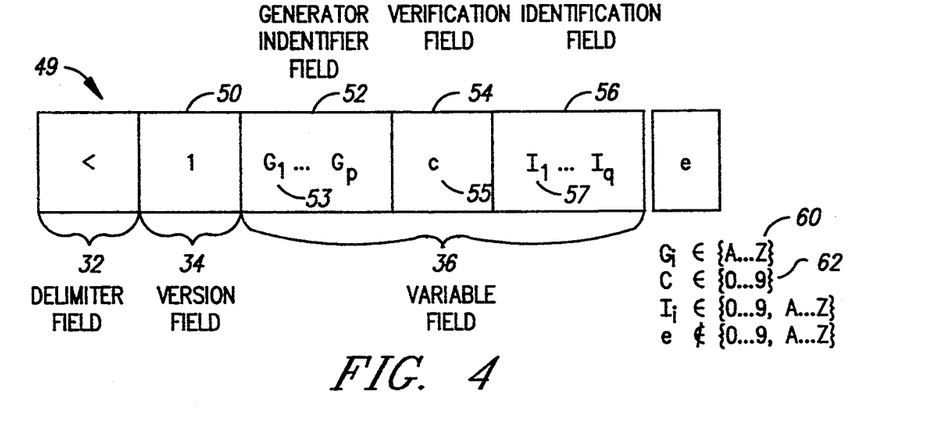
FIG. 4 is an embodiment of a version of the token architectures of FIG. 3.

Referring to FIG. 4, a token architecture 49 of a particular version of the token architecture 40 of FIG. 3 is shown. The value for the version string 44 is a "1" (item 50) indicating the token architecture is the first version for the token architecture of FIGS. 2 and 3.

In the preferred embodiment of version "1" of the token architecture, the variable field 36 consists of a generator identifier field 52, a verification field 54 and an identification field 56. The version dependent body sections format is dependent on the rules defined for the version. The body sections for version 1 provide implementation specifications and an algorithm for generating tokens in the version 1 format.

The generator identifier field 52 is adjacent the version field 34. The generator identifier field 52 contains a generator identifier string 53 of at least one character. The generator identifier string 53 specifies the origin of the token. That is, the generator field 52 identifies which computer system, in a multiple computer system, generated the unique token. The format of the token generator identification string is a variable length, uppercase, English alphabetic field using letters A-Z (item 60). The field is terminated by the occurrence of a non-uppercase alphabetic character 62.

Each computer system instance capable of creating tokens uses a specified token version and has an assigned globally unique token generator identifier. The generator identifier can be assigned by a central administrator for the system and stored in a central registry (such as a generator identity table) stored in a database accessible by the computers in the computer system. The specified body format for the version is also registered in the central registry facility. A query facility is used to access the information on the format and version specific information registered in the facility.

Adjacent the generator identifier field is the verification field 54. The verification field contains a one character verification character 55 used as a check digit. The check digit is provided to insure that the token has not been corrupted during generation or subsequent handling. The verification system is an internal consistency check which is inexpensive in terms of CPU time and memory requirements; yet it increases the integrity of the data. At any time, the validity of a token may be verified by recomputing and validating the check digit. There are many algorithms known to those skilled in this field that can be used to provide a verification system.

In the preferred embodiment, the algorithm is as follows. A value representing each character from all sections after the initial delimiter is mapped to its corresponding value. Characters within the 0 through 9 range are mapped correspondingly to the numeric values 0 through 9. The letters A through Z are mapped to corresponding values in the range of 10 through 35. These values are totaled. For the purpose of computation, the value of the check digit position is taken to be zero. The number of total characters in the key after the initial delimiter including the check digit length are added to the sum for the value representing each character. The sum is divided by ten and if the remainder is zero, then the check digit is zero. If the remainder is not equal to zero, then the check digit is the difference of ten and the remainder. Other algorithms can be easily substituted to produce a check digit or other verification character which are well known to those skilled in the art. The verification character is placed in the verification field following the generator identifier string. The placement of the verification character in the token can also be varied.

The algorithm selected favors very inexpensive check digit validation over generation cost. In this embodiment, the check digit can be verified by simply adding up the character values (using the mapping described above) of all of the characters in the token (including the check digit) and the number of characters in the token (excluding the recognition character). The remainder of this sum and "10" will always be 0 for valid tokens. Using this scheme, it is necessary to parse the token and explicitly find the check digit.

The self-checking feature enhances integrity and increases reliability. The checking feature consists of all printable characters thus making it suitable for imbedding in interactive software applications.

Adjacent the verification field 54 is the identification field 56. The identification field 56 contains an identification string 57 of at least one character. The identification string 57 provides a unique value for a version and generator. The combination of the version string 50, generator identifier string 53, and identification string 57 are universally unique within the computer systems using the token identification system.

The format of the identification string 57 is a varying length string of uppercase, English alphabetic character letters A through Z, and numeric digits 0 through 9. The field (and token) is terminated by the occurrence of a non-uppercase alphabetic, non-numeric character. An example of a termination character for the token would be a blank space.

In a preferred embodiment, the identification string is generated so as to increase one at a time (sometimes known in the industry as monotonically increasing). The token termination is delimited by the first occurrence of a character outside the domain of the characters allowed in the preceding token field. In the version 1 token architecture, the last token field is the identification field 56 containing characters in the character set type range of capital letters A though Z and numeric characters 0 through 9. Therefore, when parsing text strings to identify tokens, the presence of a character outside the range specified for the identification field indicates that the token is terminated.

The generator identifier string and the identification string are varying lengths. The fields of the token do not require delimiters due to the use of mutually exclusive character ranges. In version 1, the ranges used are numeric values 0-9, uppercase alphabetic characters A-Z. Alternatively, exclusive delimiters of different lengths could be implemented. However, the preferred embodiment provides a shorter, more compact token. While specific character ranges and symbols have been specified, alternative ranges such as lowercase alphabetics or different initial and final delimiting characters can also be implemented.

The tokens can support or use any binary character set. The architecture can be applied to any coded character set using an arbitrary number of bits to represent each character. The representation (bit values) of the characters can optionally be chosen to be printable codepoints. In the version 1 architecture, the tokens are specifically designed to be printable in ASCII or EBCDIC. The printability of the tokens is a convenience implemented in version 1 to facilitate direct human interactions and manipulations such as imbedding the tags in text as references, debugging, etc. In other versions where human ease of use considerations are not applicable, the full range of binary coding may be used to maximize the density of the space and minimize the length of the token.

The set of homogeneous identifiers can be used to persistently and uniquely identify virtually anything. The token architecture generates enough name space to sufficiently potentially replace existing naming schemes such as phone numbers, Library of Congress numbers, geographic coordinates, UPC codes, and date and time stamps. The tokens are independent of and can be applied to any object (person, book, video, license plate, telephone number or address), event (past, present, future, borrowing of a book, a phone call), or location (longitude, latitude, altitude, date, time). They can also be used to identify instances of objects. The token architecture has no internal hierarchy, complex order, location, or time basis. The generation rules are simple and encapsulate the minimum information needed to identify items using the tokens. The tokens are not object or even related by the data.

Figure 5:
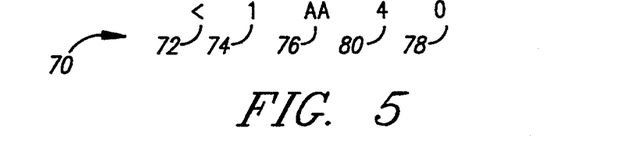
FIG. 5 is an example of a token using the version architecture of FIG. 4.

Referring to FIG. 5, a token 70 conforming to the specifications of the version 1 token architecture 49 of FIG. 4 is shown. The token has the value <1AA40. The "<" 72 is the delimiter character. The "1" 74 indicates that the token 70 is a version 1 token. The "AA" 76 indicates the token 70 was generated by a system generator designated as "AA". The identification string 57 has a value of "0" 78. The verification character (check digit) 55 has a value of "4" 80, which is derived from the algorithm explained in detail above $(10-((1+10 \ ("A") + 10 \ ("A") + 0 + 5 \ (\text{the number of digits})) \bmod 10))$.

The tokens are generated by concatenating into a string format, the token recognition character, the version string identifying the token version and the variable string that is unique within a version and conforms to a format specified for that version. In the preferred embodiment of the version 1 tokens, the concatenated fields of the variable field are the generator identifier string identifying the token generator, the verification character generated by the algorithm described above, and an identification string that is unique for a token generator.

The tokens are associated with represented items using a table having the tokens as candidate key to entries providing a description of the represented item. The tokens can be assigned automatically by the computer system or manually input by a system user to identify virtually any item or occurrence.

The tokens are recognized when parsing a text area using the token recognition character. The token version is then identified and a table provides the specification for the variable field. The end of the token is determined during the parsing procedure by the presence of a character from a character set type that is different from the character set type called for by the version format for the last field of the token.

The items represented by the tokens are identified using the tokens as candidate keys for tables containing descriptions and related information about the represented items.

The concatenation and details of implementing the generation of the tokens, the implementation of the association of tokens with items, the implementation of the token recognition process, and the implementation of the identification process are well known to those skilled in this field.

Figure 6:
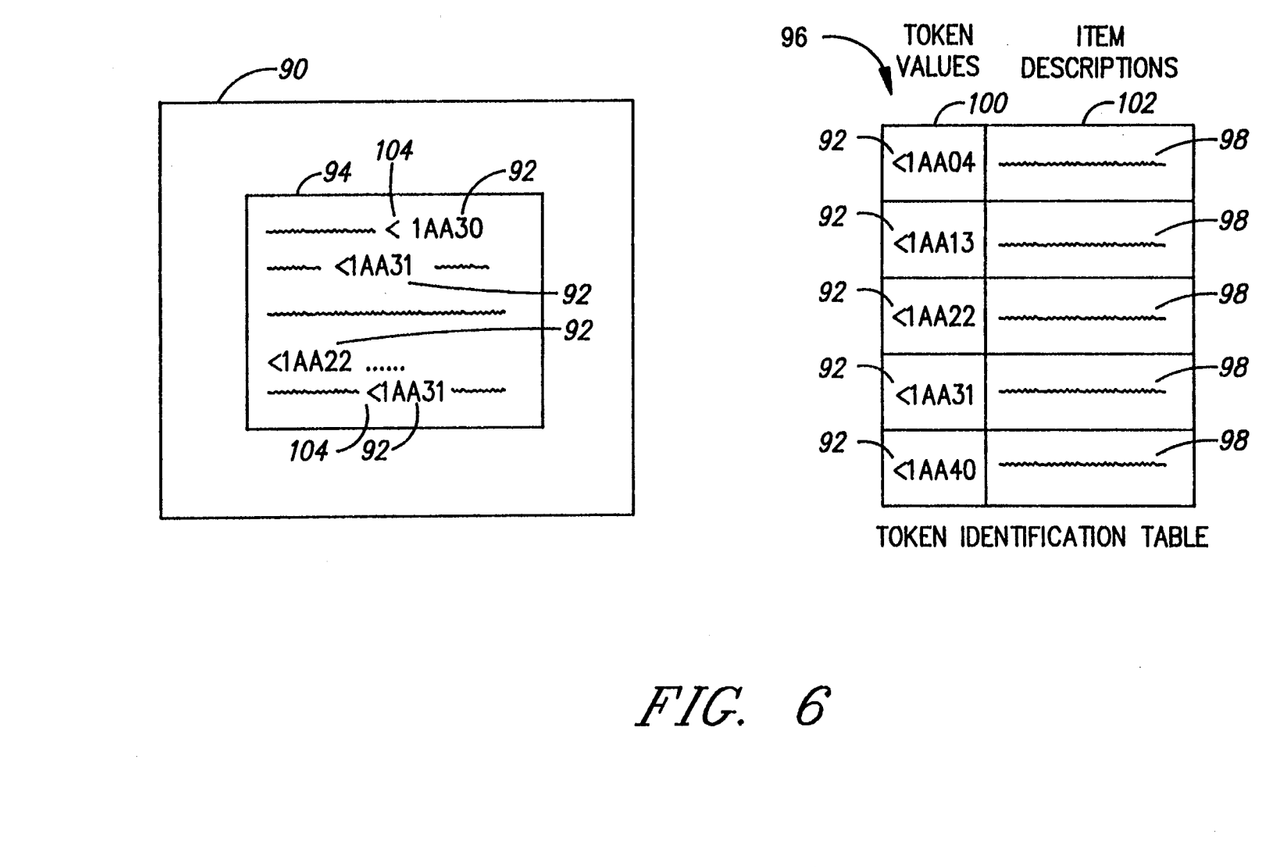
FIG. 6 is a diagram showing a system using the token identification system.

Referring to FIG. 6, use of the token identification system is shown in the context of a computerized text processor 90. Tokens 92 are used to represent further descriptions to be imbedded in the text 94.

A table 96 is used to store the tokens in conjunction with a description of the item represented 98. The token identification table 96 has as one column 100 the token values 92 and as another column 102 the descriptions of the items represented by the tokens 98.

Tokens are used throughout the text area 94. When the text 94 is parsed, the candidate tokens 92 are recognized based on the token recognition character 104. Once the token is recognized as a token, the token itself is parsed to identify the version and the remaining information unique to that version such as the termination of the token. The version 1 tokens can be verified using the check digit. The tokens are then used as a key to find an entry in the token identification table where a description of the item represented by the token is found. In a preferred embodiment, the generator identifier string identifies the generator which generated the token and a token identification table for one or more generators is used to identify the related information. The token itself can also be used to directly represent an object.

The token identification system provides a scheme to supply universally unique token identifiers that are infinitely extensible thus providing enough capacity to identify a large number of items. The tokens are object independent, homogeneous, persistent, and without ambiguity. The token architecture supports parallel assignment from an arbitrarily large number of servers while maintaining uniqueness.

The identification system overcomes many the problems of the existing identification systems. The system provides flexibility for the format of the token since all that is required of the token identifiers is that the token begin with a token recognition character followed by a version identifier. Tokens in the required format can be generated and processed by the token identification system. Therefore, other identifications schemes can be easily adapted to conform to this system. For example, all social security numbers can altered to start with the token recognition character and the social security scheme can be given a version number that would be placed after the token recognition character. The variable field for the token would contain the nine digit social security number and then would become part of this system. Any existing system can be given a version separate number unique for that identification system, the identifiers can be changed to start with a token recognition character and the variable field would contain identifier strings in the format of the other existing systems. This identification system also provides flexibility by not being limited to only one specific type of object or instance. The same system can be used for almost anything identified by an existing token identification system.

Further flexibility is provided by the extensibility of the tokens. There is no limit to the size of the tokens or the number of versions of tokens (except those imposed by limits in computer architecture and memory capabilities). The version field and variable field are both of varying lengths. The fields are delimited by having the characters at the end of the field be from a different character set type from characters at the start of the adjacent field. In that way, when a token is being parsed, the field is delimited by the change in character set types rather than having a fixed field length. Likewise, the token itself is delimited by a character not in the character set of the ending field string.

While the invention has been particularly shown and described with reference to a preferred embodiment thereof, it will be understood by those skilled in the art that various other changes in the form and details may be made therein without departing from the spirit and scope of the invention. Accordingly, the method and system herein disclosed are to be considered merely as illustrative and the invention is to be limited only as specified in the claims.

We claim:

1. A computer system providing a computerized token identification system using tokens generated by said computer system for uniquely representing a plurality of items, said computer system comprising:
 a plurality of unique tokens;
 computer generation means for generating one of said plurality of unique tokens;
 computer assignment means for associating said one of said plurality of unique tokens with an item;
 computer recognition means for recognizing said one of said plurality of unique tokens; and
 computer identification means for identifying the item associated with said one of said plurality of unique tokens,
 wherein each of said plurality of unique tokens comprises:
 a delimiter field containing a token recognition character;
 a version field following the delimiter field containing a version string of at least one character, identifying a unique token version; and
 a variable field adjacent said version field, containing a variable string of at least one character, conforming to a format specification for said unique token version, each variable string being unique for a unique token version.

2. The system of claim 1 wherein said version field is adjacent said delimiter field.

3. The system of claim 2 wherein said version string is of varying lengths.

4. The system of claim 3 wherein the characters of said version string and said variable string that are adjacent are from different character set types.

5. The system of claim 4 wherein said variable string is of varying lengths.

6. The system of claim 1 wherein said variable field comprises:
 a generator identifier field, adjacent said version field, containing a generator identifier string of at least one character, identifying a unique token generator;
 a verification field, adjacent said generator identifier field, containing a verification character; and
 an identification field, adjacent said verification field, containing an identification string of at least one character, wherein said identification string is unique for a unique token generator.

7. The system of claim 6 wherein the generator identifier string and the identification string are of variable lengths.

8. The system of claim 7 wherein the characters of the generator identifier string and the identification string that are adjacent are from different character sets.

9. A computer system providing a computerized token identification system using tokens generated by said computer system for uniquely representing a plurality of items, said computer system comprising:
- a plurality of unique tokens;
- computer generation means for generating one of said plurality of unique tokens;
- computer assignment means for associating said one of said plurality of unique tokens with an item;
- computer recognition means for recognizing said one of said plurality of unique tokens; and
- computer identification means for identifying the item associated with said one of said plurality of unique tokens, wherein each of said plurality of unique tokens comprises:
- a delimiter field containing at least one token recognition character;
- a version field immediately following the delimiter field containing a version string of varying length having at least one character, identifying a unique token version; and
- a variable field immediately following said version field, containing a variable string of a varying length of at least one character, conforming to a format specification for said unique token version, each variable string being unique for a unique token version, wherein the characters of said version string and said variable string that are adjacent are from different character set types.

10. The system of claim 9 wherein said variable field comprises:
- a generator identifier field, adjacent said version field, containing a generator identifier string of at least one character, identifying a unique token generator;
- a verification field, adjacent said generator identifier field, containing a verification character; and
- an identification field, adjacent said verification field, containing an identification string of at least one character, wherein said identification string is unique for a unique token generator,
- wherein the generator identifier string and the identification string are of varying lengths, and the characters of the generator identifier string and the identification string that are adjacent are from different character sets.

11. In a data processing system having a processor and a memory, a computerized token identification system using tokens generated by said computer system for uniquely representing a plurality of items, each of said tokens having a token structure consisting of a plurality of fields, said token structure comprising:
- a delimiter field containing a token recognition character, wherein said delimiter field is one of said plurality of fields;
- a version field following the delimiter field containing a version string of at least one character, identifying a unique token version, wherein said version field is one of said plurality of fields; and
- a variable field adjacent said version field, containing a variable string of at least one character, conforming to a format specification for said unique token version, each variable string being unique for a unique token version, wherein said variable field is one of said plurality of fields.

12. The system of claim 11 wherein said version field is adjacent said delimiter field.

13. The system of claim 12 wherein said version string is of varying lengths.

14. The system of claim 13 wherein the characters of said version string and said variable string that are adjacent are from different character set types.

15. The system of claim 14 wherein said variable string is of varying lengths.

16. The system of claim 11 wherein said variable field comprises:
- a generator identifier field, adjacent said version field, containing a generator identifier string of at least one character, identifying a unique token generator;
- a verification field, adjacent said generator identifier field, containing a verification character; and
- an identification field, adjacent said verification field, containing an identification string of at least one character, wherein said identification string is unique for a unique token generator.

17. The system of claim 16 wherein said generator identifier string and said identification string are of varying lengths, and the characters of the generator identifier string and the identification string that are adjacent are from different character sets.

* * * * *